Figure 1:
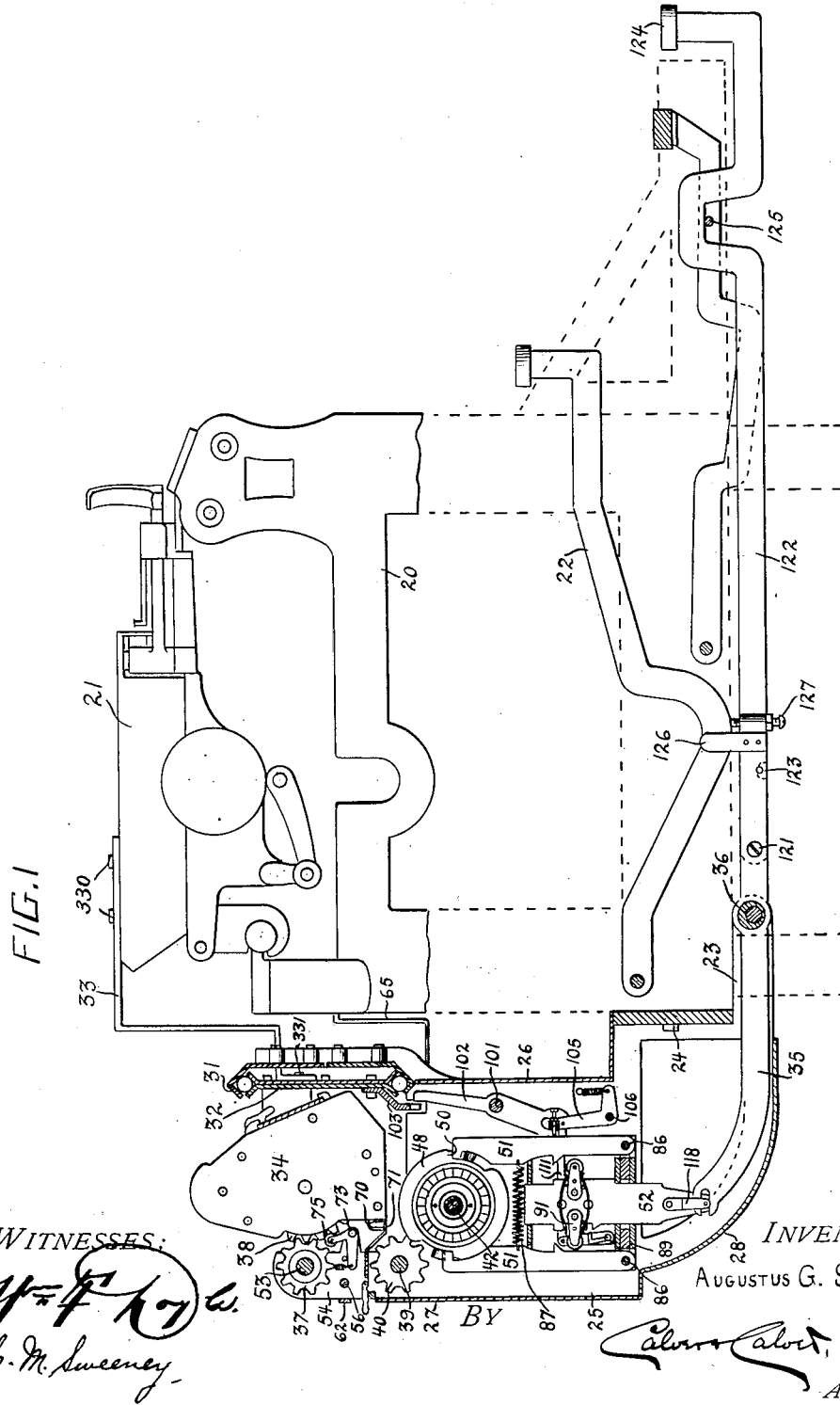

A. G. SNYDER.
COMPUTING MACHINE.
APPLICATION FILED DEC. 22, 1910.

1,122,320.

Patented Dec. 29, 1914.
7 SHEETS—SHEET 3.

INVENTOR:
Augustus G. Snyder
BY
Attorneys.

A. G. SNYDER.
COMPUTING MACHINE.
APPLICATION FILED DEC. 22, 1910.
1,122,320.
Patented Dec. 29, 1914.
7 SHEETS—SHEET 4.
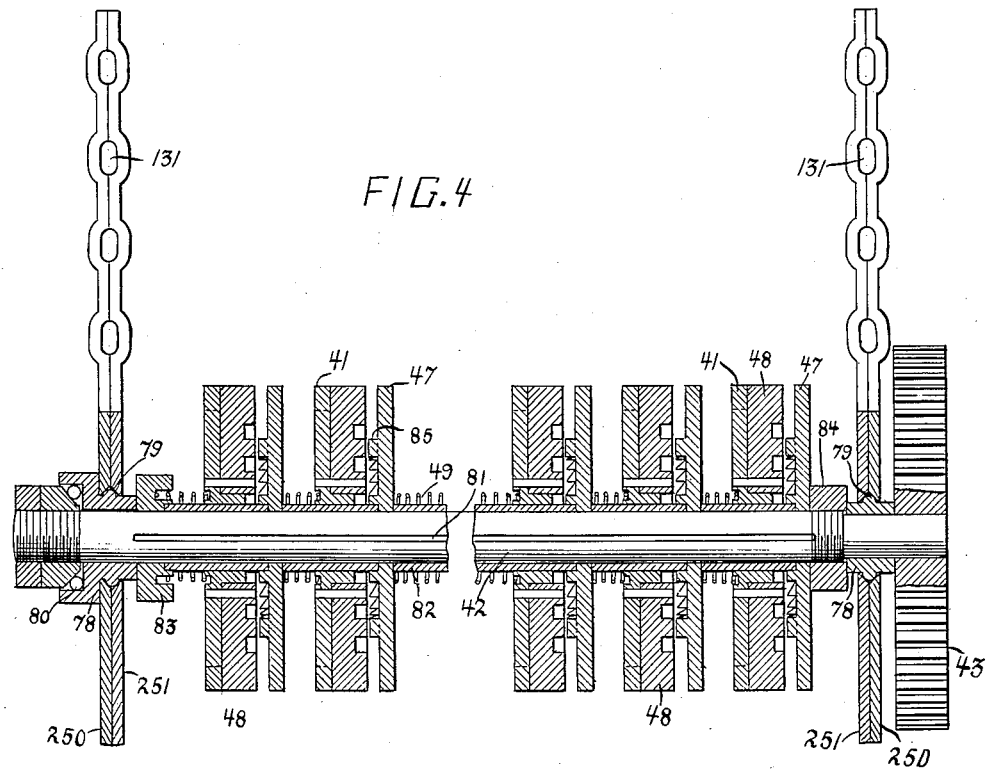
WITNESSES:
INVENTOR:
Augustus G. Snyder.
BY
Attorneys

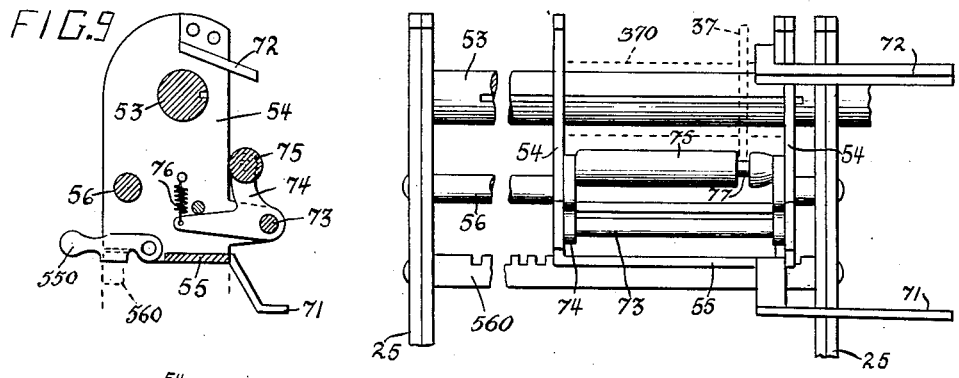

A. G. SNYDER.
COMPUTING MACHINE.
APPLICATION FILED DEC. 22, 1910.
1,122,320.
Patented Dec. 29, 1914.
7 SHEETS—SHEET 6.
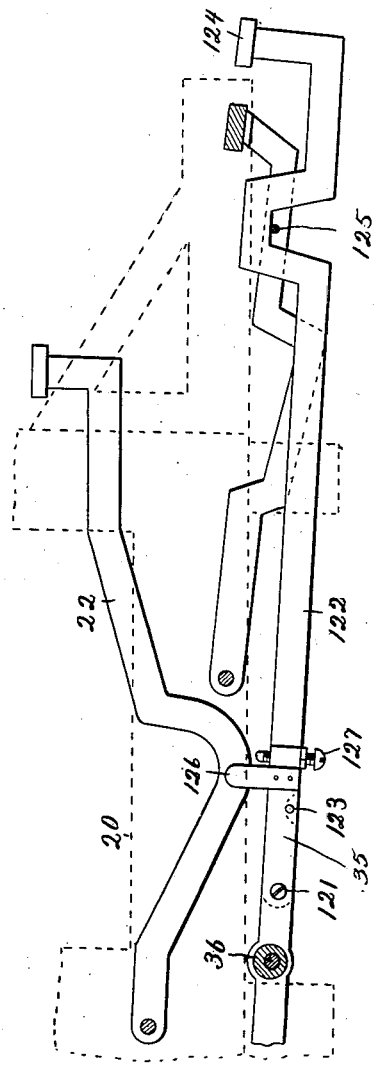
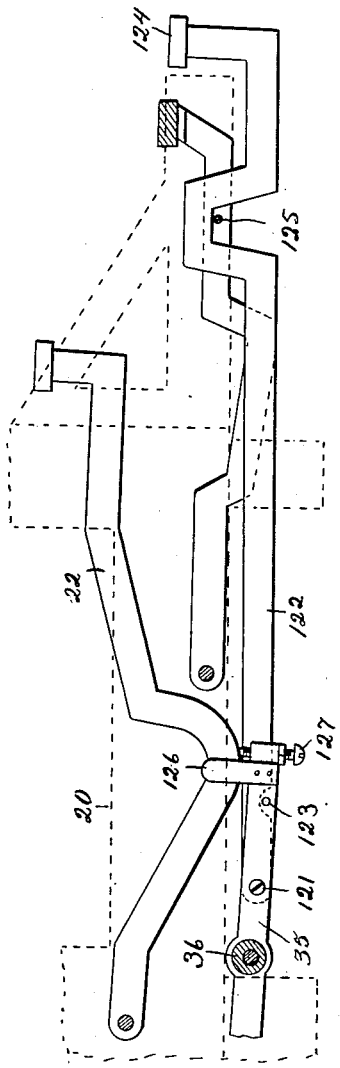

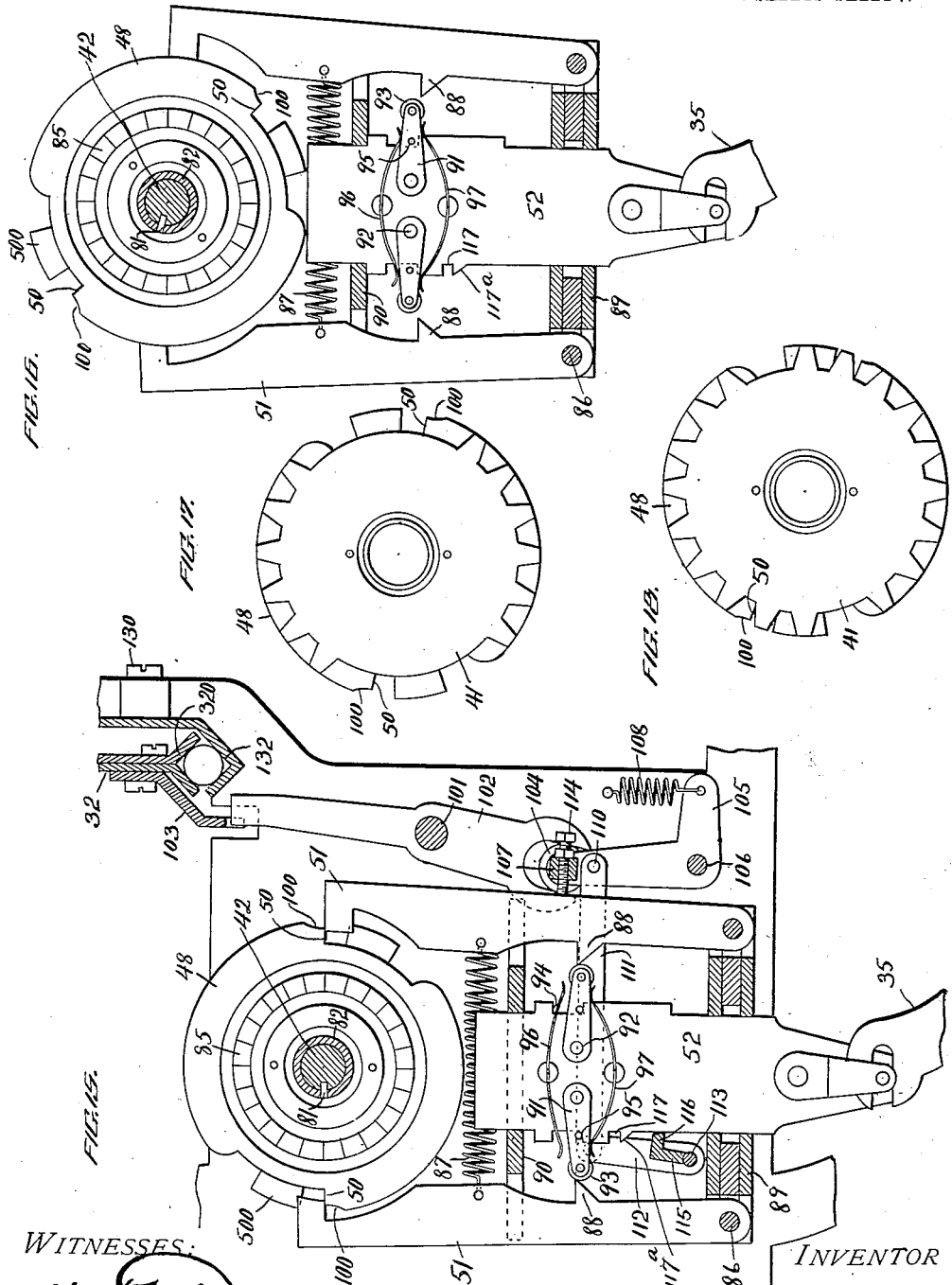

UNITED STATES PATENT OFFICE.

AUGUSTUS G. SNYDER, OF UTICA, NEW YORK, ASSIGNOR, BY MESNE ASSIGNMENTS, TO GEORGE H. SPITZLI, OF UTICA, NEW YORK.

COMPUTING-MACHINE.

1,122,320.  Specification of Letters Patent.  Patented Dec. 29, 1914.

Application filed December 22, 1910. Serial No. 598,873.

*To all whom it may concern:*

Be it known that I, AUGUSTUS G. SNYDER, a citizen of the United States, residing at Utica, in the county of Oneida and State of New York, have invented or discovered certain new and useful Improvements in Computing-Machines, of which the following is a specification, reference being had therein to the accompanying drawings.

This invention relates to computing and registering mechanism and has reference more particularly to calculating mechanism designed for use as an attachment for typewriting machines, although, as will hereinafter appear, many features thereof are not limited in their utility to their association with typewriting mechanism, but are capable of use in connection with computing machines generally.

For convenience the invention is herein shown and described in the form of a modification of the machine disclosed in my application for Letters Patent filed June 3, 1910, Serial No. 564,875, and in which have been presented claims to certain of the general features of the mechanism shown and described but not claimed herein.

The general type of machine to which the present invention relates, when constructed as an attachment for typewriting machines, comprises a totalizer moving with the typewriter carriage and including a series of index or number wheels respectively actuated by operating gears which, during the feed of the typewriter carriage, are brought successively into engagement with a master gear and turned thereby. The amount of rotation of the master gear, and the consequent extent to which the totalizer is operated, is governed by an escapement mechanism which, in turn, is operated by means controlled by the numeral key levers of the typewriter. The arrangement is such that, in writing upon a certain portion of the page, at each depression of one of the typewriter numeral keys, the totalizer will be actuated to change one or more of the digits of the number registered thereby so as to vary said number by an amount depending upon the key depressed, while the order of the digit or digits so changed will depend upon the position of the typewriter carriage at that time.

One of the objects of the present invention is to provide means whereby the number or index wheels or members of the totalizer, and the gears for operating the same, with the exception of the gear at any time in operative engagement with the master gear and the number wheel operated thereby, are at all times locked against accidental displacement, said locking means, however, having provision for permitting the necessary carrying or transfer operations between the several number wheels.

A second object of the invention is to provide an improved escapement mechanism and controlling means therefor which will be of a simple and durable construction and absolutely accurate and reliable in its operation.

Another object of the invention is to provide means whereby, upon the depression of one of the numeral key levers, the remaining key levers will be locked against depression and the carriage on which the totalizer is mounted be locked against movement by its feed mechanism until the computing and registering operation started by said depressed key is fully completed.

A further object of the invention is to provide a computing attachment of typewriters, adapted to be operated by the manipulation of the typewriter numeral keys, which may also be operated independently of the typewriting mechanism, so that sub-computations and operations of multiplication and division may be effected without causing the intermediate steps of such operations to be recorded by the printing mechanism of the typewriter.

These and other objects of the invention, together with means whereby the same may be carried into effect, will best be understood from the following description of one form or embodiment thereof illustrated in the accompanying drawings. It is to be understood, however, that the construction described and shown has been chosen for illustrative purposes merely, and that the invention may be embodied in other forms without departing from the spirit and scope thereof.

Figure 2:
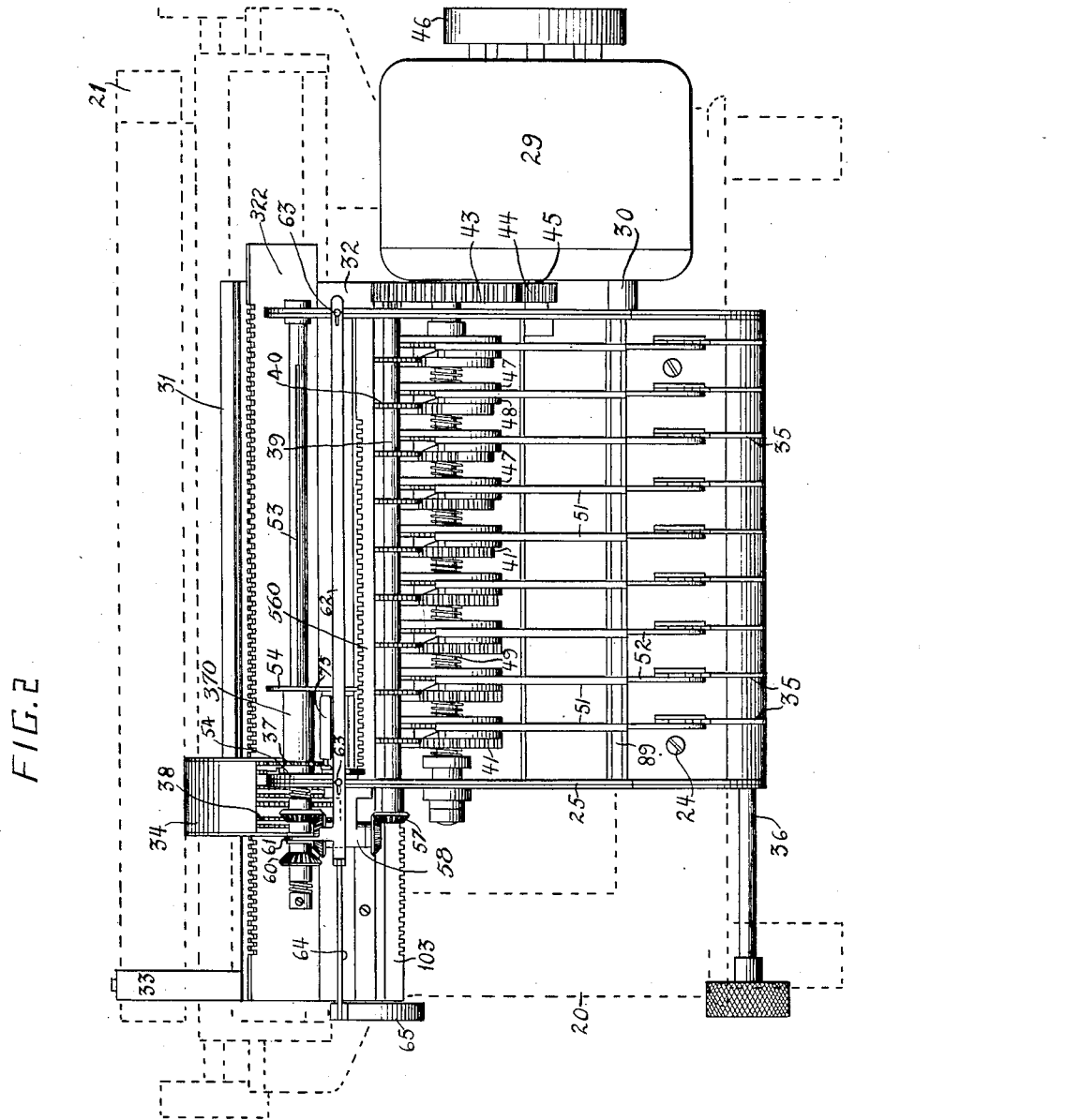
Figure 3:
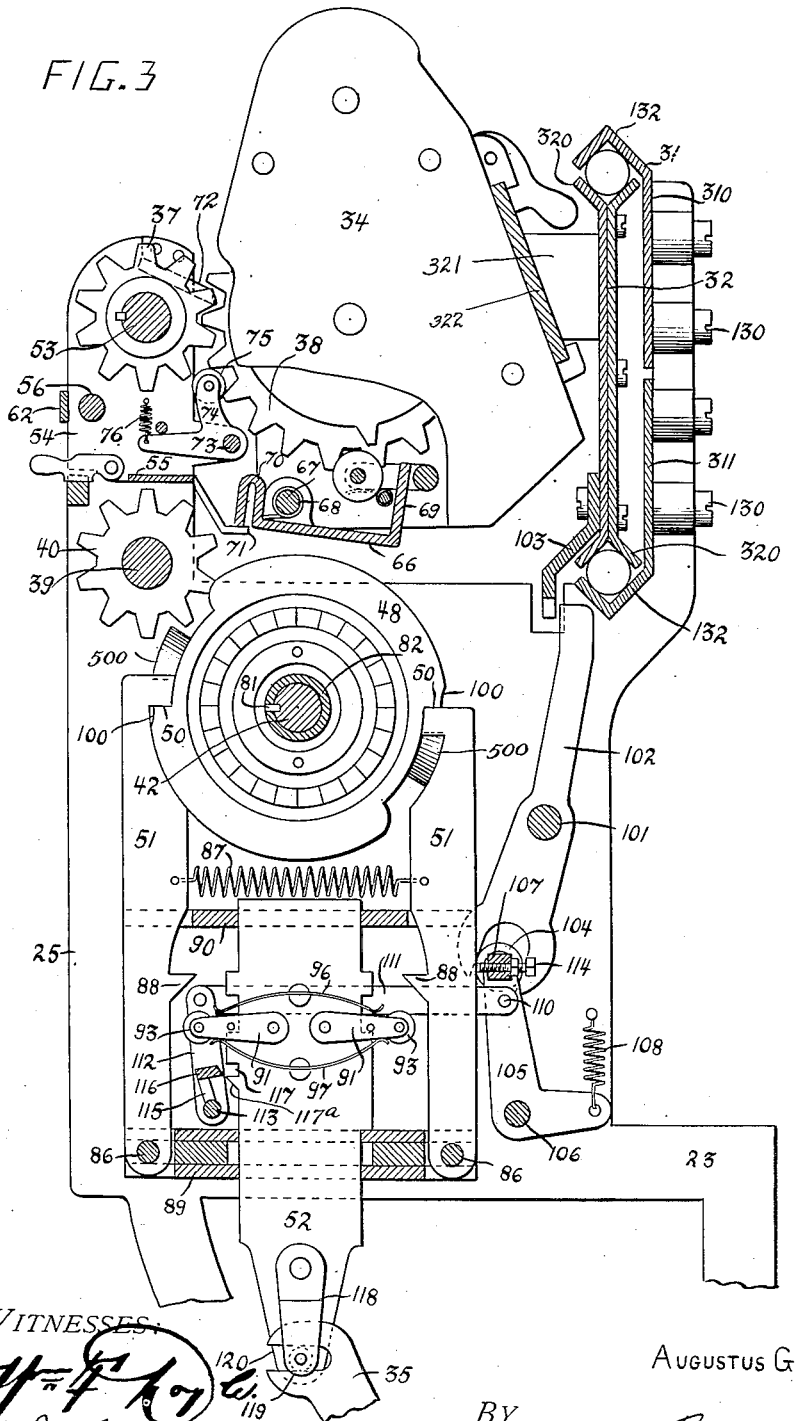

In said drawings: Figure 1 is a side elevation of a typewriter having my invention applied thereto, certain parts of the typewriter being omitted and the computing mechanism being shown partly in section. Fig. 2 is a rear elevation of the computing mechanism shown in Fig. 1, the cover plates of the computer casing being removed. Fig. 3 is an enlarged sectional view of parts of the computing mechanism shown in Fig. 1. Fig. 4 is a vertical sectional view of the parts associated with the actuating shaft. Fig. 5 is an elevation of one of the groups of parts shown in Fig. 4, and also showing one of the stop arms. Fig. 6 is a detail of a part of the mechanism for locking the typewriter escapement. Figs. 7 and 8 are front and rear elevations respectively of the slide for adjusting the master gear and certain parts associated therewith. Fig. 9 is a vertical sectional view of the slide shown in Figs. 7 and 8. Fig. 10 is a sectional detail of the alternative gearing for adapting the machine for either addition or subtraction. Fig. 11 is a detail view of certain parts shown in Fig. 3 as viewed from the opposite side. Fig. 12 is a horizontal section taken substantially on the line 12—12, Fig. 11. Figs. 13 and 14 are detail views showing the key levers and associated parts in different positions. Figs. 15 and 16 are views showing the mechanism illustrated in the lower part of Fig. 3 in two different positions. Figs. 17 and 18 are face views of two of the actuating gears and their attached stop hubs as viewed from the side opposite that shown in Figs. 15 and 16.

Referring to Figs. 1 and 2 20 denotes a typewriter frame having a carriage 21, movable longitudinally thereof and fed in any usual or well known manner, and 22 one of the key levers for operating the typewriting mechanism. In order to avoid confusion the remaining features of the typewriter construction are omitted. The computer frame comprises a bracket 23 secured to the typewriter frame 20 by any suitable means such as bolts 24 and supporting a casing consisting of end uprights 25, a front cover plate 26, and upper and lower rear cover plates 27 and 28, respectively. The motor casing 29 is secured to one of the end uprights 25 by any suitable means such as studs or bolts 30. Said uprights 25 are extended upwardly beyond the casing and support a track 31 upon which is slidably mounted a totalizer carriage 32. Said totalizer carriage is connected with the typewriter carriage as by an arm 33 secured to said typewriter carriage 21 by means of screws 330 and to the totalizer carriage by means of a screw 331 (see Fig. 1). The carriage 32 is provided with rearwardly extending arms or brackets 321 (see Fig. 3) carrying between them a bar 322 (see Figs. 2 and 3) upon which is adjustably mounted a totalizer 34. Pivoted between forwardly extended arms of the uprights 25 are a series of operating arms or levers 35 having their forward ends extended into the paths of movement of the numeral key levers 22 when the latter are depressed.

Mounted on the computer frame is a master gear 37 (see Fig. 3) adapted to engage successively the operating gears 38 of the totalizer 34 as the totalizer carriage 32 is fed forwardly in unison with the typewriter carriage 21. For actuating and controlling the master gear 37 there is provided within the computer casing, the following escapement mechanism. Operatively connected with the master gear, by means hereinafter more fully described, is a countershaft 39 carrying a series of gears 40 meshing with a second series of gears 41 (see Fig. 2) on the actuating shaft 42 (see Fig. 1). Said actuating shaft is connected by suitable gearing 43, 44 with the shaft 45 of the motor within the casing 29, said motor being controlled, if desired, by a suitable governor 46. The continuously rotating motor and shaft 42 constitute the actuator for the computing mechanism, which, in connection with the master gear and associated parts, operatively connects said actuator with the totalizer, serves as operating or actuating and controlling means for the latter, and is itself controlled by means, presently to be described, operatively connected with the typewriter key levers through the arms 35. The gears 41 (of which two are shown in detail in Figs. 17 and 18) are provided with a progressively varying number of teeth, and are loosely mounted on the shaft 42. Intermediate the gears 41 are collars or disks 47 (see Figs. 3, 4 and 5) fast to the shaft 42, while secured to each of the gears 41 is a stop hub 48. The disks 47 and hubs 48 are provided with coöperating clutch faces which are interengaged by means of springs 49 which tend normally to move the hubs 48 toward said disks. Said stop hubs are provided with lateral cam faces 500 (see Fig. 5) and with stop shoulders 50, coöperating with stop arms 51, which, when withdrawn, permit the gears 41 to be clutched to the shaft 42 by the spring 49 and rotate therewith to a certain predetermined extent, after which they are unclutched and stopped in a predetermined position as will be more fully explained. When one of the gears 41 is so rotated by the shaft 42, the shaft 39 and the master gear 37 are rotated an amount depending upon the number of teeth on the gear 41 in question. The stop arms 51 are operated, as will presently be more fully described, by slides 52 having their lower ends connected to or engaged by the rear ends of the operating arms or levers 35.

The general organization and operation of the machine as a whole having thus been indicated, the preferred construction of the various essential elements thereof will now be described more in detail together with that of certain secondary or accessory mechanisms and devices which contribute to the convenience and accuracy of operation of the primary or essential parts.

As herein shown the master gear 37 is carried by a sleeve 370 (see Figs. 2, 7 and 8) mounted on a shaft 53 journaled in the uprights 25. The sleeve 370 is connected with the shaft 53 by means of an elongated spline so as to rotate therewith while being movable longtudinally thereof by means of a slide comprising arms or uprights 54 (between which said sleeve substantially fits) connected by a base member 55.

56 denotes a stationary bar supported by the uprights 25 in a position substantially parallel to the shaft 53. The uprights 54 (see also Fig. 9) are formed with openings which loosely receive the shaft 53 and bar 56, whereby said slide is supported and guided on said shaft and bar for longitudinal movement.

560 denotes a second stationary bar supported by the uprights 25 and formed with a series of notches coöperating with a latch 550 pivoted on the slide 54, 55 and by which said slide, together with the master gear 37, may be retained in any desired position. By adjusting the master gear on the shaft 53 the portion of the travel of the typewriter carriage through which said master gear will operatively engage the totalizer may be varied according to the requirements. Connected by suitable gearing 57 with the countershaft 39 is a short upright shaft 58 (see Figs. 2 and 10) suitably journaled in bearings secured to one of the uprights 25 and carrying at its upper end a bevel gear 59, adapted to mesh with either one of a pair of bevel gears 60 splined to the shaft 53. For shifting the gears 60 to cause the shaft 53 to be rotated in either direction, in order to adapt the machine for either addition or subtraction, there is provided a clutch fork 61 projecting upwardly from a slide 62 guided by studs 63 projecting from the uprights 25, said slide being connected by a link 64 with a subtraction key or lever 65.

The operating arms or levers 35 (see Fig. 1) are herein shown as fulcrumed on an eccentric portion of a shaft 36 journaled in the forwardly extended arms of the uprights 25. By turning said shaft 36 the operating arms may be raised or lowered into and out of position to be engaged by the key levers 22.

Certain features of the parts last described are covered by the claims of my application for Letters Patent filed May 28, 1910, Serial No. 564,300, and such features are not claimed herein except in so far as they differ materially in construction from the corresponding parts in said prior application.

The totalizer 34 is preferably of the type comprising a series of index or numeral wheels and a coöperating series of operating gears 38. Said totalizer, as herein illustrated, is substantially as disclosed and claimed in my application for Letters Patent filed November 29, 1910, Serial No. 594698. In accordance with the present invention, however, said totalizer is provided with a locking lever 66 (see Fig. 3) pivoted on a pin 67 surrounded by a torsional spring 68 tending normally to hold said lever with its upturned end 69 projected between the teeth of the gears 38, thereby normally locking said gears and the number wheels operated thereby against rotation. The opposite end 70 of the lever 66 projects without the totalizer casing into a position to be engaged, during a portion of the travel of the totalizer with the typewriter carriage, by a cam plate 71 (see also Figs. 7, 8 and 9) on the slide 55. The form and position of the cam plate 71 is such that before the totalizer gear 38 for operating the number wheel of the highest order is brought into engagement with the master gear 37 the end 70 of the locking lever 66 will be raised and the opposite end 69 depressed, thereby unlocking all of the gears 38 which remain unlocked until the gear for operating the number wheel of the lowest order has passed out of engagement with the master gear, when the end 70 of the locking lever will pass out of engagement with the plate 71 and the spring 68 will again cause the end 69 of said lever to lock all of the gears 38.

It will be observed that the operation of the locking lever 66 is to lock all of the totalizer gears against rotation when the totalizer is removed from the machine and at substantially all times during the travel of the totalizer with its carriage except when one of said gears is in engagement with the master gear. When any of these totalizer gears 38 is in engagement with the master gear, however, all of the said gears are unlocked. It is desirable that all of these gears be locked with the exception of that one actually in mesh with the master gear. In order to lock such of the gears as have not yet been brought into engagement with the master gear during the travel of the totalizer, there is provided upon the slide 55 a locking plate 72 (see Figs. 3, 7, 8 and 9) having its edge lying in a position to pass between the teeth of the totalizer gears 38 prior to their engagement with the master gear, thereby locking these gears against rotation. The form and arrangement of this plate is such as to engage and lock the gears 38 prior to or at the time that these gears are unlocked by the lever 66 but to pass out of engagement with each gear as said gear is brought into mesh with the master gear 37. In order to lock said totalizer gears 38 after they pass out of engagement with the master gear and before the locking lever 66 again becomes operative to lock these gears the following means are provided. Upon a pintle 73 carried by the slide 55 are mounted a pair of arms 74 carrying at their ends a bar or roller 75 (see Figs. 2, 3, 7 and 8) adapted to enter between the teeth of the gears 38 and normally held in a position to engage said gears by a spring 76. The roller 75 is provided, substantially in the plane of the master gear 37, with a groove 77 of a depth and width to receive the edge of the gear 38 in mesh with the master gear.

The operation of the locking mechanism thus far described is as follows: During the first part of the travel of the totalizer in the feed of the typewriter carriage the locking lever 66 under the influence of its spring 68 acts to lock all of the totalizer gears 38. Prior to or at substantially the time that the first of said gears 38 is brought into mesh with the master gear the end 70 of said locking lever is engaged by the plate 71 thereby unlocking all of the gears 38. In the meantime, however, all of the gears 38 in the rear of that in engagement with the master gear have been engaged and locked by the plate 72. The gear 38 in mesh with the master gear may be rotated by said master gear by reason of the position of its periphery in the groove 77. As the totalizer is fed forwardly to bring the gears 38 successively out of engagement with the master gear these gears are engaged by the roller 75 and again locked or held against rotation. The roller 75 is of such a length that as the first of the gears 38 passes out of engagement therewith the last of said gears has passed out of engagement with the master gear and the locking lever 66 has passed out of engagement with the plate 71 so that said locking lever again locks all of the totalizer gears against rotation. If, as any of the gears 38 is rotated by the master gear 37, a carrying or transfer operation to the number wheel of a higher order is necessary this is permitted by the yielding of the spring 76 which holds the locking roller 75 in engagement with the gear or gears for operating said number wheel or wheels of the higher order.

In my prior application Serial No. 564,875, above referred to, the gears 40 carried by the countershaft 39 were loosely mounted on said countershaft and independently connected therewith by a series of ratchet clutches whereby each of these gears was adapted to rotate said shaft. In accordance with the present invention these gears are rigidly mounted on said shaft so that as said shaft is rotated by any one of said gears the remaining gears will also be rotated. This, however, is permitted by reason of the fact that each of the gears 41 with which said gears 40 coöperates has a plain or untoothed portion which normally lies adjacent the corresponding gear 40. The rotation of any gear 40 will therefore not result in a rotation of the corresponding gear 41, but when said gear 41 is rotated the gear 40 will be correspondingly rotated by an amount depending upon the number of teeth carried by said gear 41.

In the present machine the mounting of the actuating shaft 42 and the parts carried thereby is as follows: The uprights 25 of the computer frame (as shown in Fig. 4) are formed each of two plates 250 and 251. The bearings for the shaft 42 are formed in boxes 78 having beadings 79 of substantially semi-circular cross section received in openings in the plates 250 and 251, said beadings being clamped between the beveled edges of said openings for holding said boxes in proper position. This arrangement permits axial adjustment of the boxes 78 to bring the bearings for the shaft 42 into alinement. Said boxes may if desired be provided with ball bearings 80. The shaft 42 is provided with an elongated spline or key 81 and has mounted thereon a series of sleeves 82 and disks 47 alternately arranged and provided with slots or key seats coöperating with said spline. Said series of sleeves and disks is interposed between a collar 83 and an adjustable nut 84 by which said parts may be securely clamped. Upon the sleeves 82 are loosely mounted the gears 41 and the stop hubs 48 rigidly attached to said gears, said stop hubs 48 and disks 47 having coöperating clutch faces 85.

In accordance with the present invention I prefer to form each of the gears 41 with two groups of teeth of the requisite number each to provide the stop hubs 48 with two stop shoulders 50, and to provide two oppositely arranged stop arms 51 (see Figs. 3, 11, 15 and 16) pivoted at 86 to the computer frame and connected by a spring 87. By this arrangement of parts reliability of operation is secured and all eccentric stresses tending to injure the mechanism are avoided.

The stop arms 51 are provided with cam projections 88 which are engaged by dogs, hereafter more fully described, carried by the slides 52 as said slides are moved upwardly by their operating arms 35. During the first part of the upward movement of a slide 52 the dogs thereon engage the cam projections 88 on the corresponding arms 51 and move said arms outwardly, thereby releasing the corresponding stop hub 48 and allowing its attached gear 41 to be clutched to and rotate with the shaft 42. As the slide 52 continues to rise the dogs thereon are moved out of engagement with the cam projections 88, causing the stop arms to be again placed under the influence of their spring 87 so as to unclutch the gear 41 from the shaft 42 and positively stop the same, as will be more fully explained.

It is desirable that means, independent of the movement of the slides 52, be provided for insuring the immediate disengagement of the cam projections 88 from their operating means on said slides as soon as the arms 51 have been operated sufficiently to release the stop hubs 48. Otherwise it might be possible, if the operating key were not fully depressed, to lift the parts to such a position that the dogs carried by the slide 52 would not pass out of engagement with the cam projections 88, thereby holding the stop arms 51 inoperative and permitting the gear 41 to make more than one complete operation. To this end, in the embodiment of the invention shown, is provided the following construction, reference being had to Figs. 3, 11, 12, 15 and 16. The slides 52 are guided in suitable slots in the bottom 89 of the computer casing and in a guide plate 90 within said casing. Each of said slides 52 carries two dogs located on opposite edges or said slide and each comprising a pair of arms 91 arranged on opposite sides of said slide and pivoted thereto at 92, said arms carrying at their outer ends a roller 93 adapted, as said slide is reciprocated, to engage the cam projections 88 and operate the stop arms 51. Each slide 52 is formed with notches 94 (see Figs. 11 and 12) adapted to receive pins 95 connecting the arms 91 and serving as means to limit the movement of said arms on their pivots 92. Engaging said dogs at opposite sides are springs 96, 97, the combined action of said springs being normally to hold said arms 91 with the pins 95 slightly above the bottoms of the notches 94. Beyond their pivots 92 the arms 91 are provided with heels 98 (see Fig. 11) engaged, when the slide 52 is in its lowermost position, by uprights 99 projecting from the bottom 89 of the computer casing. The stop hubs 48 are provided adjacent the stop shoulders 50 with cam surfaces 100 of a suitable form to engage the ends of the stop arms 51, after they have released the stop shoulders, and give to said arms an additional outward movement beyond that necessary to release the stop hub and permit the gear 41 to be clutched to the shaft 42. The operation of this part of the mechanism is as follows: Upon the depression of any numeral key the corresponding slide 52 is raised from its normal position shown in Fig. 3, thereby causing the cam rollers 93 to engage the cam projections 88. Upon said engagement the arms 91 will be turned slightly about their pivots 92 against the tension of the spring 97 into the position shown in Fig. 15, but as this movement is limited by the engagement of the pins 95 with the bottoms of the notches 94 the rollers 93 will be caused to move over said cam projections, thereby moving the stop arms 51 outwardly. As soon as these arms have been moved far enough to clear the stop shoulders 50 and to release the stop hub 48, said hub will be clutched to and commence to rotate with the shaft 42 carrying with it the gear 41. Thereupon the cam surfaces 100 will engage the ends of the stop arms 51 and give to them an additional outward movement. This causes the rollers 93 to be released by the projections 88 and to be immediately thrown beyond said projections as shown in Fig. 16 by the spring 97, which, as above noted, tends normally to hold the arms 91 with the pins 95 slightly above the bottoms of the notches 94 and which spring has been slightly compressed by the operation above described. It will therefore be seen that there is no possibility of the rollers 93 remaining in engagement with the cam projections 88 after the clutch hub 48 has been released. Upon the return of the slide 52 the spring 96 will yield if necessary to permit the rollers 93 to pass the projections 88. Should the spring 96 fail to return the arms 91 to normal position upon the complete depression of the slide 52 the heels 98 will be engaged by the upright 99 and the arms 91 positively returned.

Upon the operation of any one of the arms or levers 35, thereby releasing the escapement mechanism to cause a computing operation to be started, it is desirable that any movement of the totalizer or operation of any other of the arms or levers 35 be prevented until said computing operation is completed. To these ends the following mechanism is provided, reference being had particularly to Figs. 1, 3 and 15: Pivoted at 101 to the computer frame is a lever 102 adapted to engage any one of a series of teeth formed on a plate 103 secured to the totalizer carriage 32. The opposite end of the lever 102 is connected, as by a roller 104 working in a slot in said lever, to one arm of one of a pair of bell crank levers 105 mounted on a shaft 106 extending between the uprights 25. Connecting the bell-crank levers 105 is a bar 107 arranged adjacent the stop arms 51 at one side of the casing and provided with a series of adjusting screws 114 engaging said arms. A spring or springs 108 normally hold the parts above described with the lever 102 free from the plate 103. Upon the depression of a numeral key, however, the stop arms 51 are thrown outwardly, as heretofore described, and held in this position until the completion of the computing operation. One of said arms 51, in its outward movement, engages the corresponding screw 114 and moves the bar 107, whereupon the lever 102 is thrown into locking engagement with the plate 103 and remains in this position until the stop arm 51 has been returned to normal position.

An alternative construction is shown in Fig. 6 and comprises a link 108 connected at one end to the bar 107, extending between the bell crank levers 105, and at its opposite end to the rocker or operating arm 109 constituting a part of the usual escapement mechanism for the typewriter carriage. By this arrangement when the bell crank levers 105 are moved by a stop arm 51, as above described, the link 108 acts to hold the operating arm 109 and prevent the typewriter escapement from releasing the typewriter carriage until the computing operation is completed. Pivoted at 110 to the levers 105 are links 111 connected at their opposite ends to arms 112 (Figs. 3 and 15) projecting from a rock shaft 113 journaled in the uprights 25. Said rock shaft 113 carries a longitudinal bar 115 provided with a locking flange 116 adapted to enter notches 117 formed in the slides 52. The edge of said locking flange is preferably beveled, as shown, to coöperate with correspondingly beveled surfaces 117<sup>a</sup> (see also Fig. 11) formed on said slides immediately below said notches 117. When, upon the depression of one of the numeral keys, the levers 105 are actuated, by the engagement of one of the stop arms 51 with one of the screws 114 carried by the bar 107, as above described, the shaft 113 is rocked to carry the locking flange 116 into the notches 117 of the slides controlled by the remaining numeral keys, thereby preventing actuation of these slides until the computing operation is completed. Upon the release of the previously depressed key the slide 52 controlled thereby drops or returns toward normal position until the beveled surface 117<sup>a</sup> beneath the notch 117 engages the flange 116, which prevents the slide 52 from returning completely to operative position. Said slide is checked before the rollers 93 have passed, in their downward movement, the projections 88, so that the same key cannot be again operated to release the escapement until the first computing operation is completed. In this connection it is to be noted that the locking mechanism does not lock the actuated slide in its extreme position, but allows it to return nearly to initial position while the computing operation is going on, so that at the completion of said computing operation the same numeral key may, if desired, be again depressed almost instantly and with accurate results. This feature is of considerable importance since, especially in a computing attachment for typewriters, possible speed of operation is greatly to be desired. For connecting the slides 52 with their operating arms 35 each of said slides is preferably provided on one side with a bent or recessed plate 118 between which and said slide extends a pin 119 adapted to be received within the slotted or bifurcated end 120 of said lever. This arrangement provides a detachable connection between these parts but permits the positive actuation of the slides 52 by the arms 35 in both directions.

In order to adapt the calculating mechanism for use without operating the printing mechanism of the typewriter the following mechanism is provided, reference being had to Figs. 1, 13 and 14. Pivoted at 121 to each of the operating arms 35 is an auxiliary operating lever 122 resting upon a pin 123 projecting from said arm 35 and extended to any suitable point adjacent the keyboard, where it is provided with an auxiliary numeral key 124. The levers 122 are arranged to engage at their lower sides an escapement operating bar 125 which may be the usual universal bar of the typewriter or may be an auxiliary bar arranged between the arms carrying the typewriter space bar, or a portion of said space bar itself. As in my prior application Serial No. 564,300, above referred to, the arms 35 are provided at their ends with stirrups 126 loosely embracing the typewriter numeral key levers 22 and with adjusting screws 127 arranged to be engaged by said key levers when the latter are depressed. By this arrangement said arms 35 may be depressed to operate the computing mechanism without operating said key levers. When therefore one of the auxiliary numeral keys 124 is depressed as shown in Fig. 13, the lever 122, by engagement with the pin 123, depresses the corresponding arm 35 and causes the mechanism to be operated in the manner controlled thereby without however operating the typewriter printing mechanism, the screw 127 at this time moving idly away from the key lever 22. At the same time said lever 122 depresses the bar 125 and causes the typewriter escapement mechanism to be operated to advance the totalizer in the proper manner. On the other hand, when the forward ends of the arms 35 are depressed by the key levers 22, carrying with them the rearward ends of the levers 122, said levers 122 are permitted to turn slightly on their pivots 121 out of alinement with the arms 35, as shown in Fig. 14, thereby avoiding unnecessary depression of the keys 124 and space bar. Moreover it will be seen that the bar 125 may be depressed away from said levers 122 in the usual typewriting operations without operating said levers.

The gears 60 (see Fig. 10) on the master gear shaft 53 are preferably mounted on separate hubs splined to said shaft and normally forced by springs 128 toward a central hub 129 with which the clutch fork 61 coöperates. By this arrangement the gears 60 may normally be placed at such a distance apart that, in shifting the gearing, one of these gears is brought into mesh with the gear 59 before the other is moved out of mesh therewith, thereby preventing such displacement of the gearing as would make difficult the manipulation of the subtraction key 65 at any time. However, should such displacement occur the subtraction key may nevertheless be shifted to move one of the gears 60 out of mesh with the gear 59, thereby placing the other gear 60 under the influence of its spring 128, which will thereafter force said last-named gear 60 into engagement with the gear 59 when the proper relative positions are reached.

The totalizer carriage 32, as shown in Fig. 3, comprises two plates secured together face to face and having their opposite edges bent to form V-shaped ball races 320. The track 31 for said carriage preferably comprises two plates 310 and 311 secured to the computer frame by bolts or screws 130 passing through elongated openings 131 (see Fig. 4) formed between the plates 250 and 251 constituting the uprights 25, said plates 310 and 311 being bent at their edges to form ball races 132 coöperating with the ball races 320 on the carriage. By this arrangement the track 31 is rendered adjustable to compensate for wear in the ball races and balls and to obviate the necessity of careful workmanship in fitting the carriage to its track.

The complete operation of the machine is as follows: Assuming that one of the gears 38 of the totalizer has been brought into engagement with the master gear 37 and released by the locking devices 66, 72 and 75, as above described in detail, the depression of one of the regular typewriter key levers 22 or one of the auxiliary numeral keys 124 will cause the corresponding operating arm 35 to be rocked upon the shaft 36, thereby lifting the corresponding slide 52. During the upward movement of said slide the rollers 93 engage the cam projections 88 and swing the stop arms 51 outwardly, carrying their ends out of engagement with the stop shoulders 50 on the corresponding hub 48. Thereupon the spring 49 at the left of the hub in question (as shown in Fig. 4) moves said hub with its attached gear 41 toward the right and engages the clutch face thereon with the clutch face on the adjacent disk 47 which is continuously rotated by the shaft 42. The hub 48 and gear 41 thereupon commence to rotate with the disk 47. During the first part of this rotation the cam surfaces 100 on the hub give to the arms 51 an additional outward movement, which causes the rollers 93 to be disengaged from the cam projections 88 as heretofore described in detail. After the hub 48 has made substantially one half of a complete rotation, the cam surfaces 500 are brought into engagement with the ends of the arms 51, causing said hub to be moved toward the left as shown in Figs. 4 and 5 against the tension of the springs 49, thereby disengaging the clutch faces on said hub and the disk 47. After the complete disengagement of said clutch faces the stop shoulders 50 are brought into engagement with the ends of the stop arms 51, and further movement of the hub 48 and gear 41 is positively stopped. During the above described semirotation of the gear 41, the teeth on said gear meshing with the adjacent gear 40 on the shaft 39 will cause said last named gear and shaft to be rotated an amount depending upon the number of teeth on the gear 41 in question. For example, the gear 41 corresponding to the numeral key "6" (shown in Fig. 17) may have two groups of six teeth each, the gear 41 corresponding to the numeral key "9" (shown in Fig. 18) two groups of nine teeth each, and so on. If, therefore, the numeral key which has been depressed be the key "6", the gear 40 and shaft 39 will, during the above described semi-rotation of the corresponding gear 41, be turned through the space of six teeth, which may, for example, correspond to six tenths of a complete rotation of said shaft 39. This fractional rotation of the shaft 39 is transmitted, through the gearing 57, shaft 58, and gearing 59 and 60, to the shaft 53, causing a corresponding fractional rotation of the master gear 37 and totalizer gear 38. Such being the essential steps in the computing operation it is thought that the subsequent and incidental steps, such as the locking and unlocking of the totalizer carriage and operating slides 52, the feed of the carriage to bring the next adjacent gear 38 into engagement with the master gear, and the locking of the parts of the totalizer against accidental displacement will be clear from the foregoing descriptions without further explanation.

Having thus described my invention I claim and desire to secure by Letters Patent:

1. In a computing machine, in combination, a frame, a carriage movable on said frame, a totalizer mounted on said carriage and provided with a series of operating gears, a locking lever carried by said totalizer adapted normally to engage and lock all of said gears, a master gear on said frame and adapted to engage said totalizer gears as said carriage is moved, and a cam plate on said frame adapted to engage and operate said locking lever to release all of said operating gears when any of said operating gears is in engagement with said master gear.

2. In a computing machine, the combination with a totalizer having a plurality of operating devices and means for actuating the same, said totalizer and actuating means being relatively movable to bring said operating devices successively into operative relationship to said actuating means, of yielding detaining means for engaging all of said operating devices which have been moved out of operative relationship to said actuating means.

3. In a computing machine, in combination, a frame, a carriage movable on said frame, a totalizer on said carriage and provided with a series of operating gears, a master gear on said frame and adapted to engage said totalizer gears successively as said carriage is moved, and a bar supported on said frame and arranged to engage all of said totalizer gears which have been moved out of engagement with said master gear.

4. In a computing machine, in combination, a frame, a carriage movable on said frame, a totalizer on said carriage and provided with a series of operating gears, a master gear on said frame and adapted to engage said totalizer gears successively as said carriage is moved, and a bar supported on said frame and arranged to engage all of said totalizer gears which have been moved out of engagement with said master gear, said bar being held in yielding engagement with said gears.

5. In a computing machine, the combination with a totalizer having a plurality of operating devices and means for actuating the same, said totalizer and actuating means being relatively movable to bring said operating devices successively into and out of operative relationship to said actuating means, of means for locking all of said operating devices when none are in operative relationship to said actuating means, and additional means for locking each of said operating devices prior to its being brought into operative relationship to said actuating means.

6. In a computing machine, the combination with a totalizer having a plurality of operating devices and means for actuating the same, said totalizer and actuating means being relatively movable to bring said operating devices successively into and out of operative relationship to said actuating means, of means for locking all of said operating devices when none are in operative relationship to said actuating means, and additional means for locking each of said operating devices as it is moved out of operative relationship to said actuating means.

7. In a computing machine, the combination with a totalizer having a plurality of operating devices and means for actuating the same, said totalizer and actuating means being relatively movable to bring said operating devices successively into operative relationship to said actuating means, of means for locking each of said operating devices prior to its being brought into operative relationship to said actuating means, and means for locking each of said operating devices as it is moved out of operative relationship to said actuating means.

8. In a computing machine, the combination with a totalizer having a plurality of operating devices and means for actuating the same, said totalizer and actuating means being relatively movable to bring said operating devices successively into operative relationship to said actuating means, of means for locking all of said operating devices when none are in operative relationship to said actuating means, means for locking each of said operating devices prior to its being brought into operative relationship to said actuating means, and means for locking each of said operating devices as it is moved out of operative relationship to said actuating means.

9. In a computing machine, the combination with a totalizer and actuating means therefor, said totalizer and actuating means being relatively movable into and out of operative relationship and said actuating means being adjustable in the direction of said relative movement to vary the point at which said parts are brought into operative relationship, of means for automatically locking the parts of said totalizer against movement when out of operative relationship to said actuating means, said locking means being adjustable with said actuating means.

10. In a computing machine, the combination with a totalizer and actuating means therefor, said totalizer and actuating means being relatively movable into and out of operative relationship and said actuating means being adjustable in the direction of said relative movement to vary the point at which said parts are brought into operative relationship, of means for automatically locking the parts of said totalizer against movement when out of operative relationship to said actuating means, and means for releasing said locking means, said releasing means being adjustable with said actuating means.

11. In a computing machine, the combination with totalizing mechanism, of operating mechanism therefor, including an actuator, and means for operatively connecting said actuator and totalizing mechanism comprising a shaft, a series of gears fixed on said shaft, and means for independently connecting said gears with said actuator.

12. In a computing machine, the combination with totalizing mechanism, of actuating mechanism therefor, and mechanism for controlling said actuating mechanism including a stop mechanism comprising a stop hub having two oppositely located stop shoulders and a pair of stop arms having portions arranged to engage said stop shoulders simultaneously.

13. In a computing machine, in combination, a totalizer, an actuator, mechanism for operatively connecting said totalizer and actuator, and a slide carrying a pair of dogs movable to engage parts of said last-named mechanism and thereafter release the same for causing an operation of said totalizer by said actuator.

14. In a computing machine, in combination, a totalizer, an actuator, mechanism for operatively connecting said totalizer and actuator, mechanism for controlling said connecting mechanism including a stop mechanism comprising a stop hub having two oppositely located stop shoulders and a pair of stop arms having portions arranged to engage said stop shoulders simultaneously, and means comprising a slide carrying a pair of dogs movable to engage said stop arms and thereafter release the same for causing an operation of said totalizer by said actuator.

15. In a computing machine, controlling mechanism comprising a pair of stop arms having cam projections, a slide arranged between said stop arms, and a pair of dogs carried by said slide and adapted to engage said cam projections as said slide is reciprocated.

16. In a computing machine, in combination, a totalizer, an actuator, mechanism for operatively connecting said totalizer and actuator, and controlling means for said connecting mechanism adapted when operated to cause an operation of said totalizer by said actuator, said controlling means having provision for preventing more than a single operation of said totalizer at each operation of said controlling means.

17. In a computing machine, in combination, a totalizer, an actuator, mechanism for operatively connecting said totalizer and actuator, means for holding said connecting mechanism inoperative and for releasing the same to cause an operation of said totalizer by said actuator, means for engaging and operating said holding and releasing means to cause the same to release said connecting means, and means to move said engaging and operating means out of engagement with said holding and releasing means after operating the same to prevent more than a single operation of said totalizer.

18. In a computing machine, in combination, a totalizer, an actuator, mechanism for operatively connecting said totalizer and actuator, means for holding said connecting mechanism inoperative and for releasing the same to cause an operation of said totalizer by said actuator, means for engaging and operating said holding and releasing means to cause the same to release said connecting means, and means to move said holding and releasing means out of engagement with said engaging and operating means after releasing said connecting means to prevent more than a single operation of said totalizer.

19. In a computing machine, in combination, a totalizer, an actuator, mechanism for operatively connecting said totalizer and actuator, means for holding said connecting mechanism inoperative and for releasing the same to cause an operation of said totalizer by said actuator, means for engaging and operating said holding and releasing means to cause the same to release said connecting means, means to move said holding and releasing means out of engagement with said engaging and operating means after releasing said connecting means, and means thereafter to move said engaging and operating means out of a position to engage said holding and releasing means to prevent more than a single operation of said totalizer.

20. In a computing machine, the combination with totalizing mechanism, of actuating mechanism therefor, and mechanism for controlling said actuating mechanism comprising stop mechanism including a stop arm having a cam projection, a slide having a dog adapted to engage said cam projection and operate said stop arm, and a spring to throw said dog out of engagement with said cam projection after said stop arm has been operated.

21. In a computing machine, the combination with totalizing mechanism, of actuating mechanism therefor, and mechanism for controlling said actuating mechanism comprising stop mechanism including a stop arm, means for engaging and operating said stop arm, and a cam controlled by said stop arm for moving said stop arm out of engagement with said engaging and operating means after it has been operated thereby.

22. In a computing machine, the combination with totalizing mechanism, of actuating mechanism therefor, and mechanism for controlling said actuating mechanism comprising stop mechanism including a stop hub having a stop shoulder and a cam surface adjacent said shoulder, a stop arm adapted to engage said stop shoulder and hold said hub inoperative, and means to move said stop arm to release said hub, said cam surface being adapted after the release of said hub to move said stop arm out of engagement with its operating means.

23. In a computing machine the combination with totalizing mechanism, of actuating mechanism therefor, and mechanism for controlling said actuating mechanism comprising stop mechanism including a stop arm having a cam projection, a slide having a dog adapted to engage said cam projection and operate said stop arm, a cam controlled by said stop arm for moving said cam projection out of engagement with said dog after said stop arm has been operated, and a spring to throw said dog out of position to engage said cam projection after said stop arm has been moved by said cam.

24. In a computing machine, in combination, a totalizer, an actuator, mechanism for operatively connecting said totalizer and actuator, means for holding said connecting mechanism inoperative and for releasing the same to cause an operation of said totalizer by said actuator, means for engaging and operating said holding and releasing means to cause the same to release said connecting means, and means for positively returning said engaging and operating means to substantially normal position.

25. In a computing machine, the combination with totalizing mechanism, of actuating mechanism therefor, and mechanism for controlling said actuating mechanism comprising stop mechanism including a stop arm having a cam projection, a slide having a pivoted dog adapted as said slide is moved from normal position to engage said cam projection and operate said stop arm, said dog being adapted to turn upon its pivot to pass said cam projection as said slide is returned to normal position, and means for positively turning said dog back substantially to its initial position after passing said cam projection.

26. In a controlling mechanism for calculating machines, in combination, a slide, a dog pivoted thereon, a spring for holding said dog in normal position, and a fixed stop adapted as said slide approaches one extreme of its movement to engage said dog and positively move the same substantially to its normal position.

27. In a computing machine, in combination, a totalizer, an actuator, mechanism for operatively connecting said totalizer and actuator, a slide, a pair of dogs carried by said slide and adapted as said slide is moved from normal position to engage parts of said last-named mechanism and thereafter release the same for causing an operation of said totalizer by said actuator, said dogs being movably mounted on said slide and adapted to yield to pass said parts of said connecting mechanism without operating the same as said slide is returned to normal position, and means for thereafter positively returning said dogs substantially to their initial position on said slide.

28. In a computing machine, in combination, a totalizer, an actuator, mechanism for operatively connecting said totalizer and actuator, means for holding said connecting mechanism inoperative and for releasing the same to cause an operation of said totalizer by said actuator, means for engaging and operating said holding and releasing means to cause the same to release said connecting means, means for preventing more than a single operation of said totalizer at each operation of said engaging and operating means, and means for positively returning said engaging and operating means to substantially normal position.

29. The combination with computing mechanism comprising totalizing mechanism, actuating mechanism therefor, said totalizing and actuating mechanisms being relatively movable into and out of different positions of operative engagement, and mechanism for controlling the operation of said totalizer by said actuating mechanism comprising stop mechanism including a stop arm, of locking means operated by said stop arm for preventing relative movement of said totalizing and actuating mechanisms.

30. The combination with a typewriter comprising a frame, a carriage movably mounted on said frame, and an escapement mechanism for controlling the movement of said carriage; of computing mechanism comprising a totalizer movable with said typewriter carriage and mechanism mounted on said typewriter frame for actuating and controlling said totalizer; and locking means operated by said last named mechanism and coöperating with said typewriter escapement mechanism.

31. The combination with a typewriter comprising a frame, a carriage movably mounted on said frame, and an escapement mechanism for controlling the movement of said carriage and including a rocker; of computing mechanism comprising a totalizer movable with said typewriter carriage and mechanism mounted on said typewriter frame for actuating and controlling said totalizer; and locking means operated by said last named mechanism and coöperating with said rocker.

32. The combination with a typewriter comprising a frame, a carriage movably mounted on said frame, and an escapement mechanism for controlling the movement of said carriage; of computing mechanism comprising a totalizer movable with said typewriter carriage, actuating mechanism therefor mounted on said typewriter frame, and mechanism for controlling said actuating mechanism; and locking means operated by said controlling mechanism and coöperating with said typewriter escapement mechanism.

33. The combination with computing mechanism, of a plurality of keys each adapted when depressed to set into operation said computing mechanism in a predetermined manner, and locking mechanism controlled by said computing mechanism and adapted when one of said keys is depressed to prevent the operation of said computing mechanism by any of the other keys until the operation started by said depressed key is completed.

34. The combination with computing mechanism, of a plurality of keys each adapted when depressed to set into operation said computing mechanism in a predetermined manner, and locking mechanism actuated by a depressed key to prevent the operation of said computing mechanism by any of the other keys, said locking mechanism being controlled by said computing mechanism in its computing operation started by said depressed key to hold said other keys locked until the completion of said computing operation.

35. The combination with computing mechanism, of a plurality of keys each adapted when operated to set into operation said computing mechanism in a predetermined manner, and locking mechanism actuated by said keys and adapted when one of said keys is depressed to prevent the complete return of the parts operated thereby to initial position until the operation started by said depressed key is completed, said locking mechanism being adapted to permit said parts to return nearly to initial position during said computing operation.

36. The combination with computing mechanism, of a plurality of keys each adapted when operated to set into operation said computing mechanism in a predetermined manner, and locking mechanism actuated by said keys and adapted when one of said keys is depressed to prevent the complete return of the parts operated thereby to initial position and to prevent the operation of said computing mechanism by any of the other keys until the operation started by said depressed key is completed.

37. In a computing machine, the combination with totalizing mechanism and actuating mechanism therefor, of mechanism for controlling said actuating mechanism including a plurality of independently operable slides and means controlled thereby for causing an operation of said totalizing mechanism by said actuating mechanism when any one of said slides is operated, and means for locking the remaining slides against operation when one of said slides is operated until the completion of said operation of said totalizing mechanism.

38. In a computing machine, the combination with totalizing mechanism and actuating mechanism therefor, of mechanism for controlling said actuating mechanism including a plurality of independently operable slides and means controlled thereby for causing an operation of said totalizing mechanism by said actuating mechanism when any of said slides is operated, said means including a plurality of stop arms, and means operated by said stop arms for locking the remaining slides against operation when one of said slides is operated until the completion of said operation of said totalizing mechanism.

39. In a computing machine, the combination with totalizing mechanism and actuating mechanism therefor, of mechanism for controlling said actuating mechanism including a plurality of independently operable slides and means controlled thereby for causing an operation of said totalizing mechanism by said actuating mechanism when any of said slides is operated, said slides having notches, a locking bar, and means actuated when one of said slides is operated for causing said locking bar to enter the notches in the remaining slides.

40. In a computing machine, the combination with totalizing mechanism and actuating mechanism therefor, of mechanism for controlling said actuating mechanism including a plurality of independently operable slides and means controlled thereby for causing an operation of said totalizing mechanism by said actuating mechanism when any of said slides is operated, and means adapted when one of said slides is operated to prevent its complete return to its initial position until the completion of said operation of said totalizing mechanism.

41. In a computing machine, the combination with totalizing mechanism and actuating mechanism therefor, of mechanism for controlling said actuating mechanism including a plurality of independently operable slides and means controlled thereby for causing an operation of said totalizing mechanism by said actuating mechanism when any of said slides is operated, a locking bar, and means actuated when one of said slides is operated for moving said bar into a position in the rear of said slide.

42. In a computing machine, the combination with totalizing mechanism and actuating mechanism therefor, of mechanism for controlling said actuating mechanism including a plurality of independently operable slides and a plurality of stop arms operated by said slides respectively, and locking mechanism for said slides including a bar arranged adjacent said stop arms and provided with adjusting screws adapted to be engaged by the several arms.

43. The combination with computing mechanism comprising totalizing mechanism, actuating mechanism therefor, said totalizing and actuating mechanisms being relatively movable in the operation of the machine, and mechanism for controlling said actuating mechanism including a series of stop arms each adapted when operated to set into operation said computing mechanism; of means operated by said stop arms for locking said computing mechanism to prevent relative movement of said totalizing and actuating mechanisms, and locking mechanism controlled by said stop arms and adapted when one of said arms is operated to prevent the operation of the other of said arms until the operation of said computing mechanism is completed.

44. The combination of a frame, a carriage movably mounted on said frame, an escapement mechanism for controlling the movement of said carriage on said frame, a totalizer movable with said carriage, actuating mechanism therefor mounted on said frame, mechanism for controlling said actuating mechanism including a plurality of keys each adapted when depressed to cause an operation of said totalizer by said actuating mechanism, means operated by said controlling mechanism for locking said escapement mechanism, and locking mechanism actuated by said keys and adapted when one of said keys is depressed to prevent the operation of said controlling mechanism by any of the other keys until said operation of the totalizer is completed.

45. The combination of a frame, a carriage movably mounted on said frame, an escapement mechanism for controlling the movement of said carriage on said frame, a totalizer movable with said carriage, actuating mechanism therefor mounted on said frame, mechanism for controlling said actuating mechanism, a plurality of keys each adapted when depressed to cause an operation of said totalizer by said actuating mechanism, means operated by said controlling mechanism for locking said escapement mechanism, and locking mechanism controlled by said keys and adapted when one of said keys is depressed to prevent the complete return of the parts operated thereby to initial position until said operation of the totalizer is completed.

46. The combination with printing mechanism including a key lever and escapement mechanism having an escapement bar, of computing mechanism, an operating arm for said computing mechanism, and an auxiliary key lever secured to said arm and extended over said escapement bar.

47. In a computing attachment for typewriters, an operating arm, an auxiliary key lever pivoted to said arm, said lever being freely movable on its pivot in one direction, and means for limiting the movement of said lever on its pivot in the opposite direction.

In testimony whereof I affix my signature, in presence of two witnesses.

AUGUSTUS G. SNYDER.

Witnesses:
JOHN K. LIGHT,
M. L. WHITE.